United States Patent
Eitel

[19]

[11] Patent Number: 6,083,280
[45] Date of Patent: *Jul. 4, 2000

[54] METHOD OF IMPROVING A PROCESSING EFFICIENCY OF AN AUTOMATIC DATA PROCESSING SYSTEM

[76] Inventor: Robert T. Eitel, 7N7783 Sayer Rd., Bartlett, Ill. 60103

[ * ] Notice: This patent issued on a continued prosecution application filed under 37 CFR 1.53(d), and is subject to the twenty year patent term provisions of 35 U.S.C. 154(a)(2).

[21] Appl. No.: 08/937,173

[22] Filed: Sep. 25, 1997

[51] Int. Cl.⁷ ....................................................... G06N 9/45
[52] U.S. Cl. ................................................................. 717/4
[58] Field of Search ..................................... 395/701, 704; 379/266, 113, 29; 377/15; 717/4, 1; 709/100–108, 400

[56] References Cited

U.S. PATENT DOCUMENTS

| | | | |
|---|---|---|---|
| 4,048,452 | 9/1977 | Oehring et al. | 379/113 |
| 4,142,238 | 2/1979 | Brandt et al. | 702/176 |
| 4,206,346 | 6/1980 | Hirosawa et al. | 377/15 |
| 4,625,081 | 11/1986 | Lotito et al. | 379/88.26 |
| 4,881,261 | 11/1989 | Oliphant et al. | 379/215 |
| 4,988,209 | 1/1991 | Davidson et al. | 470/58.2 |
| 5,020,095 | 5/1991 | Morganstein et al. | 379/88.23 |
| 5,065,427 | 11/1991 | Godbole | 379/100 |
| 5,073,919 | 12/1991 | Hagensick | 379/29 |
| 5,103,394 | 4/1992 | Blasciak | 714/47 |
| 5,231,579 | 7/1993 | Tsuchiya et al. | 364/418 |
| 5,408,663 | 4/1995 | Miller | 709/104 |
| 5,557,773 | 9/1996 | Wang et al. | 707/3 |
| 5,675,511 | 10/1997 | Prasad et al. | 345/302 |
| 5,751,914 | 5/1998 | Coley et al. | 706/47 |
| 5,938,760 | 8/1999 | Levine et al. | 712/220 |
| 5,946,388 | 8/1999 | Walker et al. | 379/266 |

OTHER PUBLICATIONS

An environment for automatic system performance evaluation, ACM, 1993.
AN: 92:40209 Title: Synchronizing SS7, Source: Telephone Engineer & Management, Jan. 1, 1992.
Title: Symbolic model checking for event–driven real–time systems, Author: Jin et al, Source: IEEE service center, 1994.
Title: Symbolic model checking for event–driven real–time systems, Author: Jin et al, Source: ACM, 1997.

*Primary Examiner*—Kevin J. Teska
*Assistant Examiner*—Chameli Chaudhuri Das
*Attorney, Agent, or Firm*—Welsh & Katz, Ltd.

[57] ABSTRACT

A method for increasing a relative efficiency of an automatic data processing system involving a processing sequence of a plurality of event types. The method includes the steps of measuring event activity of each event type of the plurality of event types and ordering the processing sequence of at least a first set of the event types of the plurality of event types based upon the measured event activity.

20 Claims, 1 Drawing Sheet

METHOD OF IMPROVING A PROCESSING EFFICIENCY OF AN AUTOMATIC DATA PROCESSING SYSTEM

FIELD OF THE INVENTION

The field of the invention relates to computers and in particular to methods of improving data processing efficiency.

BACKGROUND OF THE INVENTION

Automatic data processing systems are known. Such systems often accept data from a variety of sources, process such data into desired results and either store the data for future use, or output the data in hardcopy form.

Data processing systems are often used by far-flung manufacturing and research organizations for a multitude of purposes. In a manufacturing context, a sales organization of a company may coordinate and track sales efforts through software applications (e.g., order-entry systems) developed for such purposes.

Data generated for sales tracking by a sales branch of an organization may be retrieved by other parts of the same organization and used for other purposes. For example, the data on sales may be provided as an input to a software application functioning as a manufacturing model which may order raw materials and schedule manufacturing activities. The price of raw materials and labor may be fed into a profitability model that may be rippled back to sales as a means of adjusting price margins. Product specifications associated with a particular sale may be entered into the data processing system and used to adjust the type of raw materials ordered and the processes used in the manufacture of the finished product.

The type of raw materials ordered for a particular manufactured product may be tracked and an overall defect rate calculated with the particular type of raw material used. In summary, data entered into a data processing system may be operated upon by numerous subroutines to generate a host of end results. Further, the processes using the data may be executed sequentially, or entirely randomly.

Similarly a call processing system used in a telecommunications context (e.g., a public switch telephone network (PSTN)) may call numerous subroutines for processing raw data. For example, a call placed by a calling party to a called party may be tracked at different points of call setup by any of a number of identifiers. The identifiers may include the number called, an identifier of the calling party (e.g., ANI number) or a randomly generated call transaction number associated with the call.

When the call request is first received by a local telephone switch by the calling party, a billing file must be created or updated based upon a number of factors including the service rate of the calling party, the identity of the called party, time of day, etc. Once a billing file is created, a controller of the local switch (by reference to the called number) may determine how to establish a connection with the called party. A call transaction file may be created and delivered along with the call to the call destination.

For example, where the call destination is a service organization of a corporation and the call may be handled by any of a number of agents of the organization, the call may be first delivered from the PSTN to a private branch exchange (PBX) or automatic call distributor (ACD) of the organization. Where the ACD has many call destinations within the ACD, the called number may be extracted from the delivered call transaction file and used to route the call into a call queue for the called number. Where the called number has a range of values (i.e., indicating agents with different qualification levels), the called number may be examined to determine a qualification level of a agent to be assigned to the call.

While in a call queue of the ACD, the identifier of the calling party (i.e., the ANI number) may be used by a data processing system of an ACD to identify the calling party as an existing customer, or a new customer. If the calling party is an existing customer, the data processing system may retrieve a customer file for display at a terminal of the selected agent at the same time the call is delivered to the agent.

In an ACD with agents in diverse locations, the identity of the calling party may be examined to identify and deliver the call to an agent that is geographically near the calling party. Where the calling party has attempted to block transmission of the ANI number, the data processing system will want to notify a selected agent of such attempt.

In summary, many different software applications may operate upon the same data at the same or at any particular stage of call progression. In addition, when many different calls are being processed concurrently, the same applications may be called repeatedly in close succession. In calling a software application, an ACD controller may often search through a list of applications (e.g., state machine tables) sequentially in the same order each time until it finds a particular application.

Often the software applications and related supporting software are ordered in a memory unit based upon a point in time (e.g., year and month) when the application was developed, with the newest application last. Even where the order of stored applications is changed based upon an attempt to place more frequently called applications first, the use of such applications may still change over time, or dynamically, based upon time of day. Where the number of applications that may be called is large, considerable time may be spent searching for the proper application. Accordingly, a need exists for a method for reducing the time spent looking for software routines based upon time-of-day and experience.

SUMMARY

It is accordingly an object of the invention to provide a novel method of improving a processing efficiency of a data processing system by re-ordering applications, and/or supporting software based upon usage.

It is a further object of the invention to provide a novel system where re-ordering can be adjusted based upon local processing needs.

These and other objects are provided by a method for increasing the relative efficiency of an automatic data processing system involving a processing sequence of a plurality of event types. The method includes the steps of measuring event activity of an event type of the plurality of event types and ordering the processing sequence of at least a first set of the event types of the plurality of event types based upon the measured event activity.

Re-ordering may be based exclusively on usage or may be adjusted based upon other criteria. For example lengthy applications may be placed last to enhance access time. Error routines may also be placed last, since errors are an exception to normal processing.

DETAILED DESCRIPTION OF A PREFERRED EMBODIMENT

Figure 1:
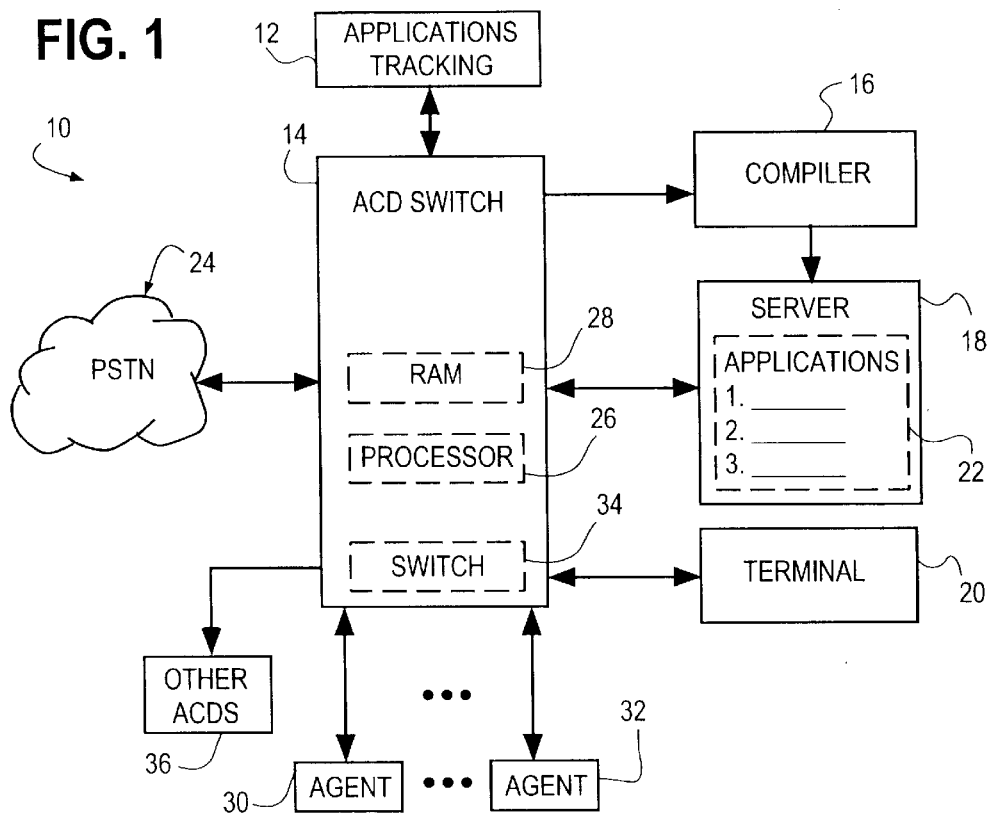
FIG. 1 is a block diagram of a data processing system in accordance with an embodiment of the invention.
Figure 2:
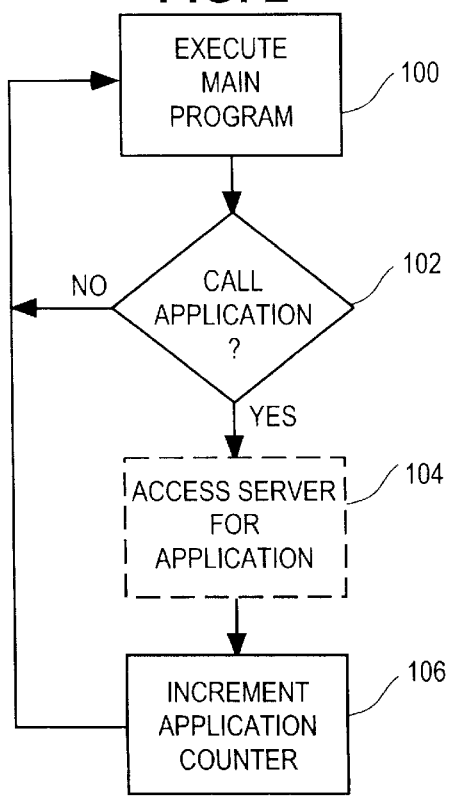
FIG. 2 is a flow chart of processing activity of the processing system of FIG. 1.
Figure 3:
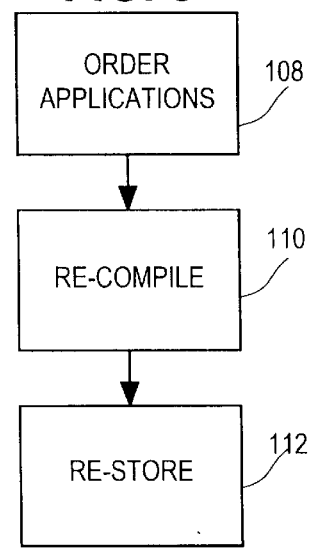
FIG. 3 is a further flow chart of processing activity of the processing system of FIG. 1.

FIG. 1 is a block diagram of an ACD 10 in accordance with an embodiment of the invention. FIGS. 2 and 3 are flow charts of processing steps executed by the system of FIG. 1. Reference will be made to FIGS. 2 and 3 as appropriate to an understanding of the invention.

Under the embodiment, calls received from the public switch telephone network (PSTN) 24 are routed to an automatic call distributor (ACD) switch 14 along with a call processing file for routing of the calls to agents 30, 32. In the opposite direction, calls may be received from any of the agents 30, 32 for routing to outside call targets through the PSTN 24 or to other agents 30, 32.

In performing its function, the ACD 14 loads programming applications (instructions) from a server 18 into a random access memory (RAM) 28. A processor 26 within the ACD 14 executes the instructions as necessary to receive and route calls as appropriate.

Upon booting-up, the ACD 14 may load a main program application and a number of subroutines (other applications). In systems 10 with sufficient memory 28, the main program and all subroutines necessary for normal operation may be loaded and be resident in memory 28 at the same time.

In other smaller systems 10, the main program and only some applications may be loaded into memory 28. In those systems 10, additional applications may be loaded as necessary for a current set of processing needs. Whenever an application is loaded from the server 18 into the smaller system 10, the loading may involve over-writing an application previously located within FRAM 28. It is to be understood that the invention is equally applicable to either system 10.

Applications 22 may initially be stored in the tape, disk or network (e.g., server) 18 and loaded during boot-up into the memory 28 under some arbitrary order (e.g., alphabetically based upon the first letter of the application name). When an application is called 102 (see FIG. 2), the processor 26 searches 102, 104 for the application within the memory 28 or (in smaller systems 10) the server 18. Since the processor 28 would typically search for applications based upon the order of storage, applications stored at the end of the memory 28 or server 18 would take longer to access and retrieve than applications near the beginning.

Following boot-up, the ACD 14 may begin processing calls 100. Upon receiving a call from the PSTN 24, the processor 26 may begin by storing a call processing file from the PSTN 24 in memory 28. The processor 26 may then attempt to identify a call destination. If the call is destined for a particular employee (e.g., agent 30), then the processor 26 may immediately connect the call to the agent 30 through the switch 34.

If the call is directed to any agent 30, 32, then the processor 26 may proceed to place the call in a queue in memory 28 and proceed with further processing. The processor 26 may also create a call processing file in memory 28 and associate the call file with the entry in the queue.

As part of the further processing, the processor 26 may call up 102 a customer identification routine from memory 28 or the server 18. The customer identifier routine may be an application that uses the caller ID (i.e., ANI number) to identify existing customers. Upon identifying the customer, the processor 26 may transfer a customer file to the call processing file in memory 28.

As part of calling the customer identification routine, the event handler (e.g., processor 26) may also increment a counter as indicated at 106 of FIG. 2 in an associated applications tracking memory 12 associated with the customer identification routine. The applications tracking memory 12 maintains a numerical record of application usage over an appropriate time period (e.g., 24 hours). The application tracking memory 12 may also generate an hour-by-hour record of application usage for later access through the terminal 20.

If upon calling the customer identification routine, it were determined that the call were not a past customer, then the processor may call another routine 102 (e.g., a new customer file generation routine) to create a new customer file. As above, the calling of the new customer routine would be recorded 106 in the applications tracking memory 12.

After queuing the call, the processor 26 may also create and maintain a time record of time in queue. The time in queue may also be added to the call processing file stored in memory 28. The processor 26 may also periodically compare the time in queue with a time in queue threshold value.

After determining that the time in queue has exceeded the threshold value, the ACD 14 may attempt to transfer the call to another ACD 36. To transfer the call, the processor 26 may call-up a call transfer routine from the server 18. Again, the processor 26 would increment a counter 106 in the application tracking memory 12 to track use of the routine.

If an agent 30, 32 had become available before the time in queue had exceeded the threshold, then the processor 26 would act to route the call to the agent 30, 32 along with the customer file. Upon answering the call, the agent 30, 32 may converse with the caller and, at the same time, accumulate additional information for the customer file. Upon concluding the call, the agent 30, 32 may activate a special program key (not shown) to update the customer file stored in the server 18. In response, the processor 26 may call-up 102 a store routine from memory 28 or the server 18 to store the additional information. Again, the processor 26 updates the applications tracking memory 12.

Periodically, when the ACD is shut-down for service, or during inactive periods or periods of low-use, the applications 22 may be re-ordered 108 based upon frequency of use as illustrated in FIG. 3. Re-ordering may be performed based exclusively on frequency of use (e.g., the most frequently used application placed first, or based upon some other criteria. For instance, it may be desirable to always place error-handling routines last. Further, some routines, because of their very length may advantageously be placed last to reduce search time. Further the main program application may also be placed last, since it is only loaded once during boot-up.

In other cases, applications that are used more heavily during short periods of the day may be re-ordered differently. In such cases, special pointer applications may be created that may be activated only during those periods and be de-activated during other periods.

To facilitate the efficient ordering of applications, a use table may be presented at the terminal 20. An operator (not shown) may execute the table as presented, or add, delete or otherwise edit the table based upon additional factors unique to the system 10. Following the re-ordering of applications, the table may be transferred by the processor 26 to the compiler 16. Within the compiler 16, the applications 22 may be re-ordered (re-compiled) 110 based upon the edited table. Following the re-compiling, the applications may be re-stored 112 in the server 18.

Following the ordering of the applications, the ACD 14 may be re-booted and processing operations repeated. After a time period the process may be repeated depending upon a processing efficiency objective.

A specific embodiment of novel methods and apparatus for improving a processing efficiency of an automatic data processing system according to the present invention have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method for increasing a relative efficiency of an automatic data processing system using a processing sequence to access a plurality of event processing applications which handle a plurality of respective event types, such method comprising the steps of:

measuring a number of occurrences of an event type of the plurality of event types during a time period; and ordering the processing sequence which accesses the plurality of event processing applications of at least a first set of the event types of the plurality of event types based upon the measured number of occurrences.

2. The method of increasing relative efficiency of the automatic data processing system as in claim 1 wherein the step of ordering the processing sequence further comprises the step of designating the most frequently occurring event type as the first event type in the ordered processing sequence.

3. A method for increasing relative efficiency of an automatic data processing system involving a processing sequence of a plurality of event types, such method comprising the steps of:

measuring event activity of an event type of the plurality of event types;

ordering the processing sequence of at least a first set of the event types of the plurality of event types based upon the measured event activity; and;

designating at least one event type of the plurality of ordered event types as ineligible for reordering.

4. A method for in creasing a relative efficiency of an automatic data processing system processing a plurality of event types through a plurality of respective event handling routines accessed from an ordered processing sequence, such method comprising the steps of:

measuring an a number of occurrences of an event type of the plurality of event types during a time period;

re-ordering the ordered processing sequence based upon the measured number of occurrences of the measured event type.

5. The method of increasing relative efficiency of the automatic data processing system as in claim 4 wherein the step of re-ordering the processing sequence of the corresponding event handling routine of the measured event type based upon the measured event activity further comprises designating the event type with a largest relative measured activity as first in the re-ordered processing sequence.

6. The method of increasing relative efficiency of the automatic data processing system as in claim 5 wherein the step of re-ordering the processing sequence of the corresponding event handling routine of the measured event type based upon the measured event activity further comprises designating the event type with a second-largest relative measured activity as second in the re-ordered processing sequence, and so on.

7. The method of increasing relative efficiency of an automatic data processing system as in claim 4 further comprising comparing the measured event activity with a threshold and re-ordering the processing sequence when the measured event activity exceeds the threshold.

8. A method for increasing relative efficiency of an automatic data processing system processing a plurality of event types through a plurality of event handling routines executed in an ordered processing sequence and where each event type has a corresponding event handling routine, such method comprising the steps of:

measuring an event activity of an event type of the plurality of event types;

re-ordering the processing sequence of the corresponding event handling routine of the measured event type based upon the measured event activity; and designating at least one event type of the plurality of ordered event types as ineligible for reordering.

9. A method for increasing relative efficiency of an automatic call distribution system processing a plurality of call types through a plurality of call handling routines accessed from an ordered processing sequence and where each call type has a corresponding call handling routine, such method comprising the steps of:

measuring a number of occurrences of a call type of the plurality of call types during a time period; and re-ordering the processing sequence for accessing call the plurality of handling routines based upon the measured number of occurrences of the call type.

10. The method of increasing relative efficiency of the automatic call distribution system as in claim 9 wherein the step of re-ordering the processing sequence of the corresponding call handling routine of the measured call type based upon the measured call activity further comprises designating the call type with a largest relative measured activity as first in the re-ordered processing sequence.

11. The method of increasing relative efficiency of the automatic processing system as in claim 9 wherein the step of re-ordering the processing sequence of the corresponding call handling routine of the measured call type based upon the measured event activity further comprises designating the call type with a second-largest relative measured activity as second in the re-ordered processing sequence, and so on.

12. A method for increasing relative efficiency of an automatic call distribution system processing a plurality of call types through a plurality of call handling routines executed in an ordered processing sequence and where each call type has a corresponding call handling routine, such method comprising the steps of:

measuring a call activity of a call type of the plurality of call types;

re-ordering the processing sequence of the corresponding call handling routine of the measured call type based upon the measured call activity; and designating at least one call type of the plurality of ordered call types as ineligible for reordering.

13. A method for increasing relative efficiency of an automatic call distribution system processing a plurality of call types through a plurality of call handling routines executed in an ordered processing sequence and where each call type has a corresponding call handling routine, such method comprising the steps of:

measuring a call activity of a call type of the plurality of call types;

re-ordering the processing sequence of the corresponding call handling routine of the measured call type based upon the measured call activity; and comparing the measured call activity with a threshold and re-ordering the processing sequence when the measured call activity exceeds the threshold.

14. An automatic data processing system using a processing sequence to access a plurality of event processing applications which handle a plurality of respective event types, comprising:

means for measuring a number of occurrences of an event type of the plurality of event types during a time period; and means for ordering the processing sequence which accesses the plurality of event processing applications of at least a first set of the event types of the plurality of event types based upon the measured occurrences of the measured event type.

15. The automatic data processing system as in claim 14 wherein the means for ordering the processing sequence further comprises means for designating the most frequently occurring event type as the first event type in the ordered processing sequence.

16. An automatic data processing system involving a processing sequence of a plurality of event types, comprising:

means for measuring event activity of each event type of the plurality of event types;

means for ordering the processing sequence of at least a first set of the event types of the plurality of event types based upon the measured event activity; and means for designating at least one event type of the plurality of ordered event types as ineligible for reordering.

17. A method for increasing a relative efficiency of an automatic data processing system having a plurality of event processing applications comprising the steps of:

counting a number of times each event processing application of the plurality of event processing applications is used during a time period; and ordering at least some of the plurality of event processing applications based upon the counted number of uses.

18. The method for increasing a relative efficiency of an automatic data processing system as in claim 17 further comprising: designating a most frequently used application as a first event processing application in the plurality of event processing applications.

19. The method for increasing a relative efficiency of an automatic data processing system as in claim 17 further comprising: designating at least one event type as ineligible for reordering.

20. Apparatus for increasing a relative efficiency of an automatic data processing system having a plurality of event processing applications comprising:

means for counting a number of times each event processing application of the plurality of event processing applications is used during a time period; and means for ordering at least some of the plurality of event processing applications based upon the counted number of uses.

* * * * *